US008265662B1

(12) United States Patent
Vargantwar et al.

(10) Patent No.: US 8,265,662 B1
(45) Date of Patent: Sep. 11, 2012

(54) DATA MODE PAGING IN WIRELESS COMMUNICATION NETWORKS

(75) Inventors: Sachin R. Vargantwar, Overland Park, KS (US); Ashish Bhan, Shawnee, KS (US); Bhagwan Singh Khanka, Lenexa, KS (US); Mark L. Yarkosky, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 619 days.

(21) Appl. No.: 12/485,223

(22) Filed: Jun. 16, 2009

(51) Int. Cl.
*H04W 68/00* (2009.01)

(52) U.S. Cl. ..... 455/458; 455/417; 455/445; 455/552.1; 455/553.1

(58) Field of Classification Search .................. 455/417, 455/445, 458, 552.1, 553.1, 561, 562.1
See application file for complete search history.

(56) References Cited

U.S. PATENT DOCUMENTS

| | | | |
|---|---|---|---|
| 4,818,987 A | 4/1989 | Ide et al. | |
| 2002/0068564 A1* | 6/2002 | Gustavsson et al. | 455/435 |
| 2004/0037222 A1* | 2/2004 | Kim et al. | 370/229 |
| 2006/0189346 A1 | 8/2006 | Turner et al. | |
| 2006/0246950 A1* | 11/2006 | Lee et al. | 455/560 |
| 2007/0135129 A1 | 6/2007 | Lucidarme et al. | |
| 2008/0051098 A1* | 2/2008 | Rao | 455/452.1 |
| 2009/0104898 A1* | 4/2009 | Harris | 455/415 |

* cited by examiner

*Primary Examiner* — Rafael Pérez-Gutiérrez
*Assistant Examiner* — Suhail Khan

(57) ABSTRACT

What is disclosed is a method of operating a wireless communication system which includes a base station and a wireless communication device in communication over a voice communication link and a data communication link. The method includes, in the wireless communication device, receiving a first page over the voice communication link. The method also includes, in the wireless communication device, entering into a data-only communication mode over the data communication link, where the voice communication link is not monitored by the wireless communication device when in the data-only communication mode, and transferring a page halt message to the base station upon entry into the data-only communication mode, where the page halt message indicates the wireless communication device is halting receipt of further pages over the voice communication link. The method also includes, in the base station, if the page halt message has been received and upon receipt of a second page for delivery to the wireless communication device, transferring the second page over the data communication link.

18 Claims, 4 Drawing Sheets

DATA MODE PAGING IN WIRELESS COMMUNICATION NETWORKS

TECHNICAL FIELD

Aspects of the disclosure are related to the field of communications, and in particular, page transfer to wireless communication devices in wireless communication networks.

TECHNICAL BACKGROUND

Wireless communication networks typically include wireless access nodes, such as base stations, through which wireless communication devices can register and receive wireless communication services. The wireless communication network also typically transfers information to the wireless communication devices to indicate incoming voice calls, text messages, network alerts, or other alerts and messages. This information, many times referred to as pages, is routed through the wireless access nodes to reach the wireless communication devices.

Wireless communication device can also typically enter data-only communication modes, during which user communications are exchanged over a different wireless link than conventional voice call communications. Unfortunately, when a wireless communication device is in the data-only communication mode, page messages transferred by the wireless communication network through a wireless access node over a voice call communication link are not received by the wireless communication device, possibly leading to network timeouts on the page messages, increased page traffic, and missed calls.

OVERVIEW

What is disclosed is a method of operating a wireless communication system which includes a base station and a wireless communication device in communication over a voice communication link and a data communication link. The method includes, in the wireless communication device, receiving a first page over the voice communication link. The method also includes, in the wireless communication device, entering into a data-only communication mode over the data communication link, where the voice communication link is not monitored by the wireless communication device when in the data-only communication mode, and transferring a page halt message to the base station upon entry into the data-only communication mode, where the page halt message indicates the wireless communication device is halting receipt of further pages over the voice communication link. The method also includes, in the base station, if the page halt message has been received and upon receipt of a second page for delivery to the wireless communication device, transferring the second page over the data communication link.

What is also disclosed is a method of operating a wireless communication system which includes a base station and a wireless communication device in communication over a voice communication link and a data communication link. The method includes, in the wireless communication device, entering into a data-only communication mode over the data communication link, where the voice communication link is not monitored by the wireless communication device when in the data-only communication mode, and transferring a page halt message to the base station upon entry into the data-only communication mode, where the page halt message indicates the wireless communication device is halting receipt of further pages over the voice communication link. The method also includes, in the base station, transferring the page halt message for delivery to a page distribution system in response to the page halt message. The method also includes, in the page distribution system, receiving a voice call request for delivery to the wireless communication device, if the page halt message has been received and the voice call request is associated with a person on a list, then transferring the voice call request in a page for delivery to the wireless communication device, and if the page halt message has been received and the voice call request is not associated with a person on the list, then withholding the voice call request for delivery to the wireless communication device. The method also includes, in the base station, upon receipt of the page for delivery to the wireless communication device, transferring the page over the data communication link. The method also includes, in the wireless communication device, receiving the page over the data communication link, accepting the voice call associated with the page, and establishing the voice call over the voice communication link.

What is also disclosed is a method of operating a wireless communication system comprising a base station and a wireless communication device in communication over a voice communication link and a data communication link. The method includes, in the wireless communication device, entering into a data-only communication mode over the data communication link, where the voice communication link is not monitored by the wireless communication device when in the data-only communication mode, and transferring a page halt message to the base station upon entry into the data-only communication mode, where the page halt message indicates the wireless communication device is halting receipt of further pages over the voice communication link. The method also includes, in the base station, if the page halt message has been received and upon receipt of a page for delivery to the wireless communication device, transferring the page over the data communication link. The method also includes, in the wireless communication device, receiving the page over the data communication link, and if the page comprises a voice call page, accepting a voice call associated with the voice call page, and establishing the voice call as a voice-over Internet protocol (VoIP) call over the data communication link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
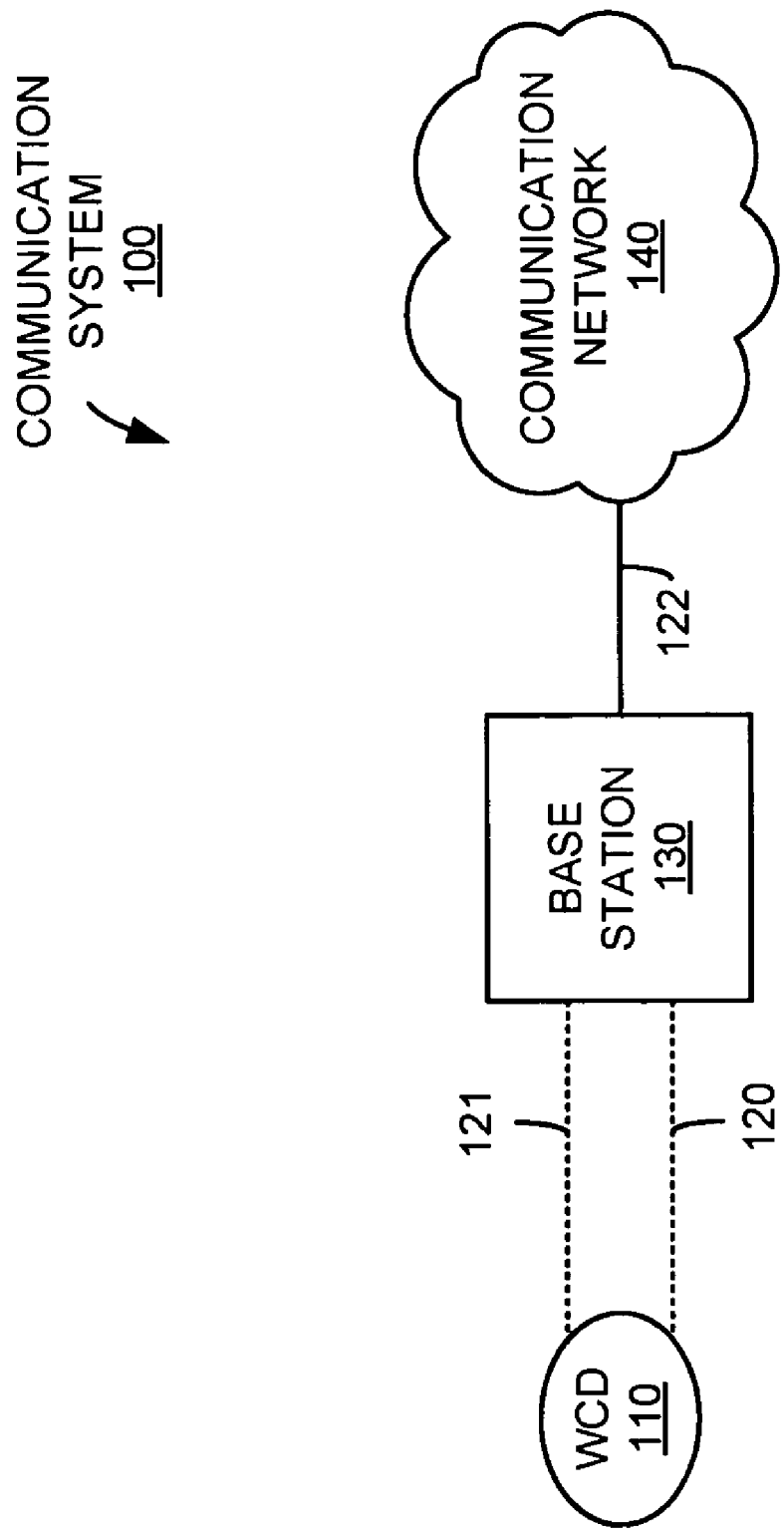
FIG. 1 is a system diagram illustrating a communication system.

FIG. 1 is a system diagram illustrating communication system 100. Communication system 100 includes wireless communication device (WCD) 110, base station 130, and communication network 140. Wireless communication device 110 and base station 130 can communicate over wireless links 120 and 121. Base station 130 and communication network 140 communicate over link 122. In the example shown in FIG. 1, wireless link 120 is a voice communication link, and wireless link 121 is a data communication link.

Figure 2:
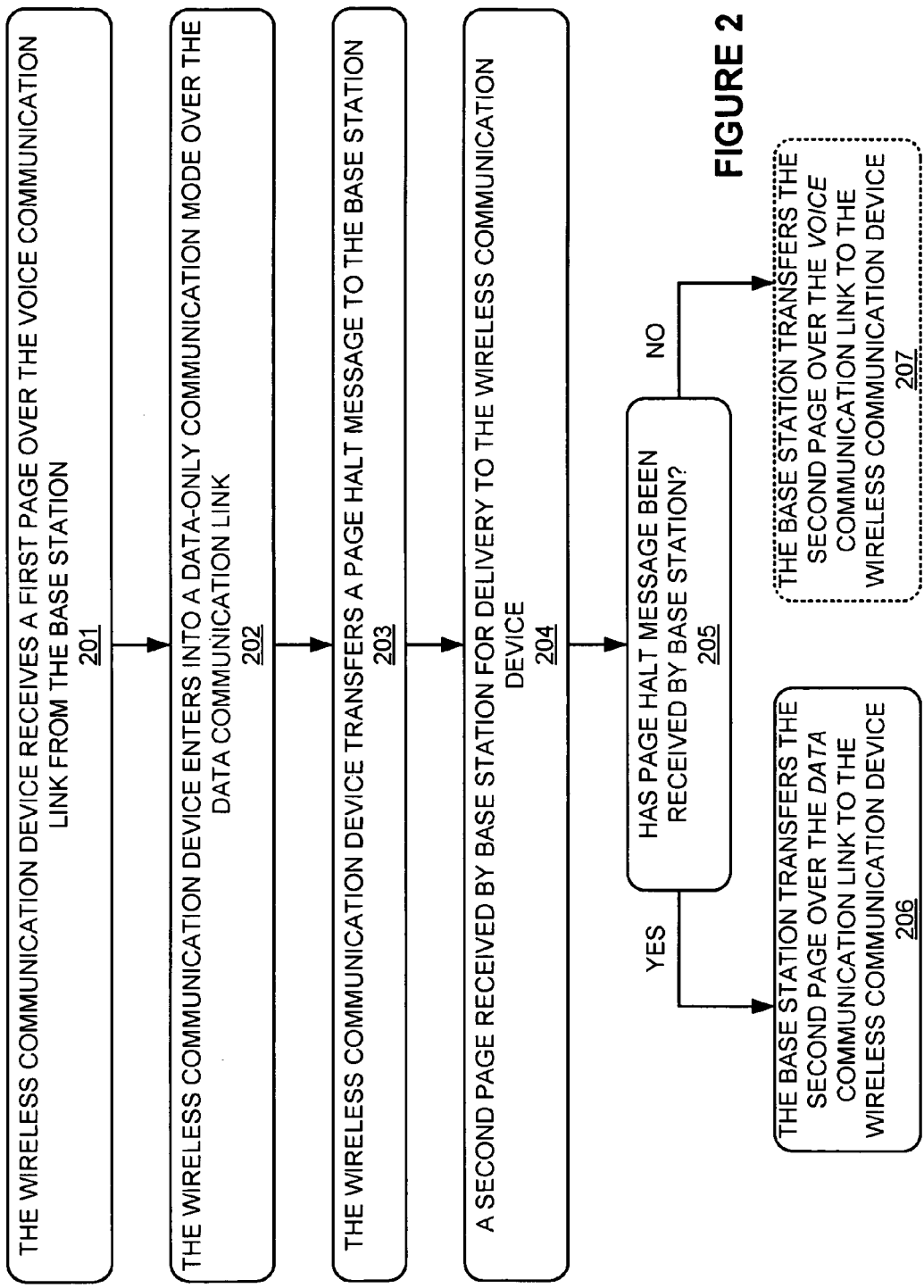
FIG. 2 is a flow diagram illustrating a method of operation of a communication system.

FIG. 2 is a flow diagram illustrating a method of operation of communication system 100. The operations in FIG. 2 are referenced herein parenthetically. In FIG. 2, wireless communication device 110 receives (201) a first page over voice communication link 120 from base station 130. The first page could include an incoming voice call request, text message, network alert, or other alert or message.

Wireless communication device 110 then enters (202) into a data-only communication mode over data communication link 121. While in the data-only communication mode, wireless communication device 110 does not monitor voice communication link 120 for pages or other communications from base station 130. Wireless communication device 110 also transfers (203) a page halt message to base station 130 upon entry into the data-only communication mode. The page halt message, in this example, indicates that wireless communication device 110 is halting receipt of further pages over voice communication link 120. In some examples, the page halt message also indicates that wireless communication device 110 is entering into the data-only mode of communication. In further examples, base station 130 receives the page halt message and ceases the transfer of page messages to wireless communication device 110. Base station 130 could transfer the page halt message to further systems or equipment in communication network 140 over link 122.

Base station 130 then receives (204) a second page for delivery to wireless communication device 110. The second page could include an incoming voice call, text message, network alert, or other alert or message. In some examples, base station 130 receives the second page from communication network 140 over link 122 for delivery to wireless communication device 110. If the page halt message has been received (205) by base station 130, then base station 130 transfers (206) the second page over data communication link 121. Wireless communication device 110 would then receive the second page over data communication link 121. Although not required, in some examples if the page halt message has not been received (205), then base station 130 would transfer (207) the second page over voice communication link 120.

Referring back to FIG. 1, wireless communication device (WCD) 110 comprises radio frequency (RF) communication circuitry and an antenna. The RF communication circuitry typically includes amplifiers, filters, modulators, and signal processing circuitry. In many examples, wireless communication device 110 includes circuitry and equipment to receive pages from base station 130, communicate with base station 130 over voice and data communication links, and enter into a data-only communication mode. Wireless communication device 110 may also include a user interface, memory device, computer-readable storage medium, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be in communication with base station 130.

Base station 130 comprises RF communication and control circuitry and an antenna. The RF communication circuitry typically includes amplifiers, filters, RF modulators, and signal processing circuitry. In many examples, base station 130 includes equipment to wirelessly transfer pages to wireless communication devices and communicate with wireless communication device 110 over voice and data communication links. Base station 130 may also comprise a router, server, memory device, software, processing circuitry, cabling, power supply, network communication interface, physical structural support, or some other communication apparatus. Base station 130 could be a wireless access node, base transceiver station, Internet access node, telephony service node, wireless data access point, or some other wireless communication system, including combinations thereof. In some examples, base station 130 includes separate equipment for communicating with wireless communication devices over each of a voice communication link and a data communication link. The separate equipment could be co-located at a single location.

Communication network 140 comprises the core network of a wireless communications provider, and could include routers, gateways, telecommunication switches, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof. In some examples, communication network 140 includes further base stations and associated equipment for providing communication services to many wireless communication devices across a geographic region.

Wireless links 120 and 121 each use the air or space as the transport media. Wireless links 120 and 121 may each use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 122 uses metal, glass, optical, air, space, or some other material as the transport media. Communication link 122 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-122 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 122 could be a direct link or may include intermediate networks, systems, or devices.

Figure 3:
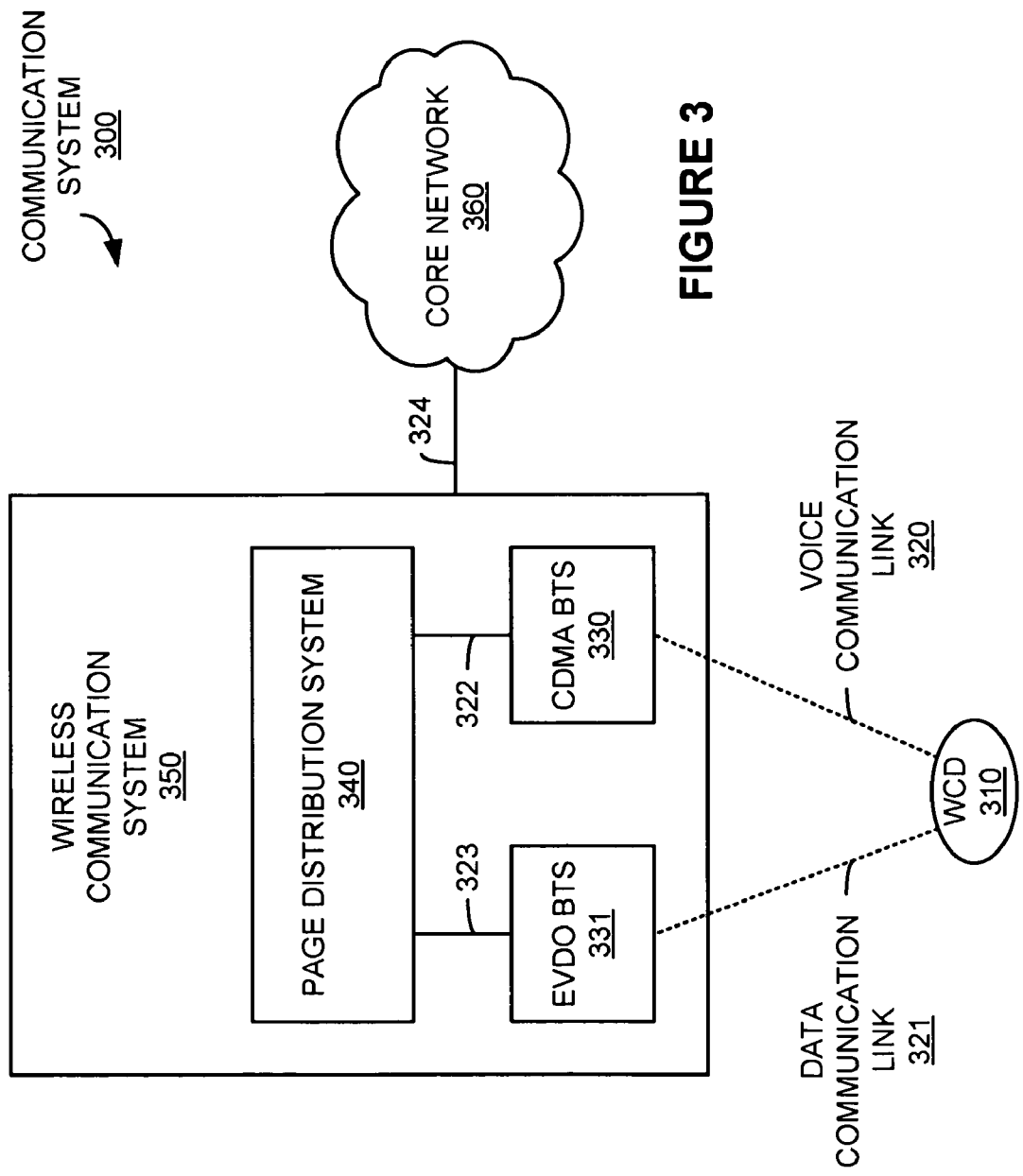
FIG. 3 is a system diagram illustrating a communication system.

FIG. 3 is a system diagram illustrating communication system 300. Communication system 300 includes wireless communication device 310, wireless communication system 350, and core network 360. Wireless communication device 310 and wireless communication system 350 communicate over wireless links 320 and 321. Wireless communication system 350 and core network 360 communicate over link 324.

In the example shown in FIG. 3, wireless link 320 is a voice communication link employing the Code Division Multiple Access (CDMA) single-carrier radio transmission technology link (1xRTT) protocol, and wireless link 321 is a data communication link employing the Evolution-Data Optimized (EVDO) protocol. Links 322-324 are T1 links in this example, and employ the Internet protocol (IP). WCD 310 is a mobile wireless phone in this example. Core network 360 is a core network of a wireless communication provider in this example, and could include further base stations, routers, gateways, controller systems, processing systems, or other communication equipment. Page messages for delivery to wireless communication device 310 could originate in core network 360 or wireless communication system 350 in this example.

Wireless communication system 350 includes wireless communications equipment capable of communicating with and providing communication service to wireless communication devices. In FIG. 3, wireless communication system 350 includes base transceiver stations (BTS) 330-331, and page distribution system 340. BTS 330 and page distribution system 340 communicate over link 322. BTS 331 and page distribution system 340 communicate over link 323.

Base transceiver stations (BTS) 330-331 each include wireless communications equipment capable of communicating with and providing communication service to WCD 310. BTS 330-331 each have a limited geographic coverage area over which they can provide communication services to wireless communication devices. Also, each coverage area of BTS 330-331 could each be further divided into sectors. A sector can represent a particular slice of a geographic coverage area, typically served by a single antenna, antenna array, or base transceiver station of an access node. Further base transceiver station equipment could be included in BTS 330-331 in examples where sectors are employed. In the example shown in FIG. 3, BTS 330 provides communication services using the CDMA protocol, and BTS 331 provides communication service using the EVDO protocol.

Page distribution system 340 includes equipment for receiving, processing, and routing page messages from core network 360 as well as from BTS 330-331. In some examples, page distribution system 340 comprises a base station controller (BSC), mobile switching controller (MSC), gateway, router, or other communications equipment. Page distribution system 340 may include a communication interface, processing systems, network interfaces, or other communications equipment, including combinations thereof. Page distribution system 340 could also incorporate a computer microprocessor, logic circuit, or some other processing device, and may be distributed among multiple processing devices. In some examples, page distribution system 340 is located within the same equipment as BTS 330-331 or found in core network 360. Page distribution system 340 could include a computer-readable medium such as a disk, tape, integrated circuit, server, or some other memory device, which could be distributed among multiple memory devices. Page distribution system 340 may include an operating system, logs, utilities, drivers, networking software, and other software typically loaded onto a computer system. Software of page distribution system 340 could contain an application program, firmware, or some other form of computer-readable processing instructions.

Figure 4:
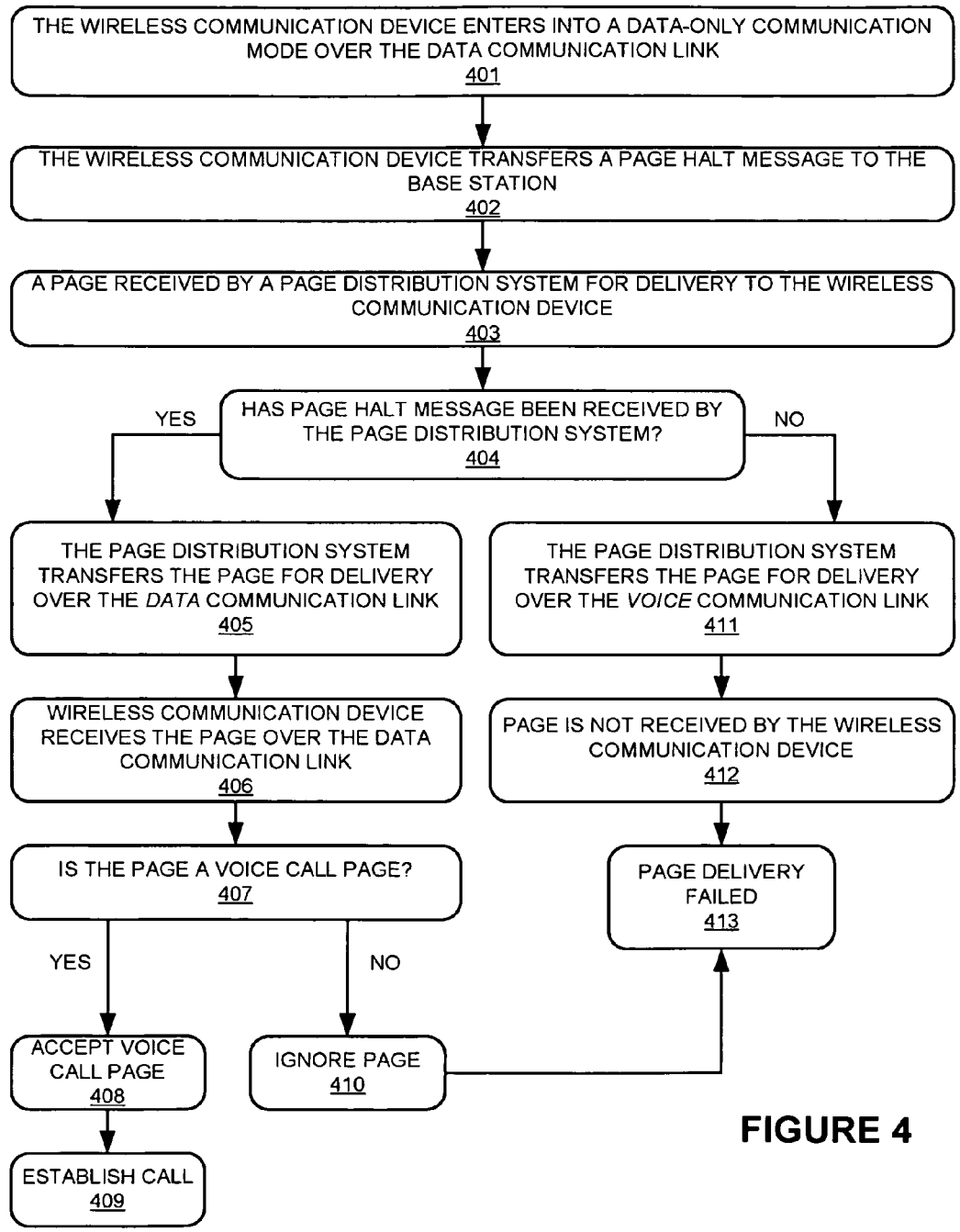
FIG. 4 is a flow diagram illustrating a method of operation of a communication system.

FIG. 4 is a flow diagram illustrating a method of operation of communication system 300. The operations in FIG. 4 are referenced herein parenthetically. In FIG. 4, wireless communication device 310 enters (401) into a data-only communication mode over data communication link 321. As a part of this entry into the data-only communication mode, wireless communication device 310 transfers (402) a page halt message to BTS 330 over wireless link 320. The page halt message could be a part of overhead communications between BTS 330 and WCD 310, or could be a discrete message transferred by WCD 310 to indicate a page halt state of operation. In further examples, the page halt message could include information to indicate WCD 310 desires to resume receiving pages over voice communication link 320, or into other modes of operation. The page halt message could be transferred over voice communication link 320 or over data communication link 321, or over a further communication link. After receiving the page halt message, BTS 330 could transfer the page halt message for delivery to page distribution system 340, or to core network 360. A page is then received (403) by page distribution system 340 for delivery to WCD 310.

If the page halt message has been received (404) by page distribution system 340, then page distribution system 340 transfers (405) the page for delivery over data communication link 321 to WCD 310. In this example, page distribution system 340 would transfer the page over link 323 to BTS 331 for delivery over data communication link 321 to WCD 310. Since WCD 310 is in the data-only mode, WCD 310 receives (406) the page over data communication link 321. WCD 310 then determines (407) if the page is a voice call page. In this example, a voice call page indicates an incoming voice call for WCD 310, such as when another person calls a phone number associated with WCD 310. If the page is a voice call page, then WCD 310 accepts (408) the voice call page and establishes (409) a voice call. However, if the page is not a voice call page, then WCD 310 could ignore (410) the page. In this example, ignoring the page includes transferring no acknowledgement of the page delivery back to BTS 331 or page distribution system 340, so the page delivery will have failed (413).

If the page halt message has not been received (404) by page distribution system 340, then page distribution system 340 transfers (411) the page for delivery over voice communication link 320 to WCD 310. However, since WCD 310 is in a data-only mode over data communication link 321, and not communicating over voice communication link 320, the page is not received (412) by WCD 310. Thus WCD 310 would transfer no acknowledgement of the page delivery back to BTS 330 or page distribution system 340, so the page delivery will have failed (413).

The transfer of the page halt message to page distribution system 340 in wireless communication system 350 advantageously alerts wireless communication system 350 that pages transferred for delivery to WCD 310 over voice communication link 320 will not receive an acknowledgment. Thus, page distribution system 340 could halt the transfer of pages for delivery to WCD 310 until WCD 310 exits the data-only mode, conserving resources of wireless communication system 350 and bandwidth over wireless link 320 due to the traffic of pages meant for delivery to WCD 310. In examples where the page halt message has been transferred, page distribution system 340 could buffer or store pages meant for delivery to WCD 310 for later delivery when WCD 310 exits out of a data-only mode. These pages could also be ignored or dropped by page delivery system 340 when WCD 310 is in the data-only mode. Also, as discussed herein, page distribution system 340 could transfer pages for delivery over data communication link 321 instead of over voice communication link 320 when WCD 310 is in data-only mode.

Additionally, page distribution system 340 could transfer some pages, while withholding others. For example, some pages may be deemed important to transfer during a data-only communication session of WCD 310, while other pages may not. Pages such as those indicating incoming phone calls could be transferred to WCD 310 for delivery over data communication link 321 when WCD 310 is in data-only mode, while other pages, such as text messages, network alerts, or other pages could be withheld from delivery to WCD 310. In some examples, only pages indicating incoming phone calls of certain priority people could be transferred after the page halt message has been transferred, where pages indicating incoming phone calls relating to non-priority people could be ignored. These priority people could be included in a list of people and stored within page distribution system 340, WCD 310, or other locations.

Furthermore, once a priority page has been received by WCD 310, then WCD 310 could choose to act accordingly on the page, such as accepting an incoming call associated with the page. However, since in many examples, data communication link 321 is typically reserved for data and not voice communications, WCD 310 may establish an incoming voice call associated with the received priority page with BTS 330 over voice communication link 320. To set up a voice call over voice communication link 320 with BTS 330, WCD 310 may immediately switch to communicating over voice communication link 320 instead of data communication link 321 in response to the priority voice call page. In other examples, WCD 310 may exchange call setup messaging and information over data communication link 321 with BTS 331 prior to switching to communicating over voice communication link 320 for the voice call. Examples of the call setup messaging or information can include resource assignment messages indicating a communication channel, frequency, or mode over which the voice call should occur, such as a CDMA extended channel assignment message (ECAM). In further examples, WCD 310 accepts the voice call over data communication link 321 with BTS 331 and the call also takes place over data communication link 321, possibly over voice portions of data communication link 321. In yet further examples, the call takes place over data communication link 321, but over data portions of data communication link 321 in the form of a packet-based call such as a voice-over-packet or voice-over-IP (VoIP) call. It should be understood that further communication links could be established for the voice call once the voice call has been accepted by WCD 310. Also, although the previous discussion relates to priority incoming voice calls, it should be understood that other pages could receive priority treatment.

The halting of page delivery over voice communication link 310 could be initiated by a user action, activating a user application dedicated to data usage, such as a web browser or data application on WCD 310, or could be initiated by present state of WCD 310. For example, WCD 310 may include a battery and monitor a charge level or state of the battery. WCD 310 could then enter into a powered-down mode due to a low battery, and—prior to entering the powered-down mode—notify wireless communication system 350 of a desire to stop receiving pages temporarily. In other examples, a present mobility state of WCD 310 could be determined, such as in examples where WCD 310 is a mobile device in motion. Also, RF conditions associated with the voice communication link could be monitored by WCD 310 to determine an RF signal quality. If WCD 310 determines that a loss of RF signal quality may occur due to movement or other present conditions, WCD 310 could advantageously transfer a page halt message to wireless communication system 350 to prevent failed page delivery and reduce page traffic levels of wireless communication system 350 for page transfer during the period of poor RF signal quality.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system comprising a base station and a wireless communication device in communication over a voice communication link and a data communication link, the method comprising:

in the wireless communication device, receiving a first page over the voice communication link;

in the wireless communication device, entering into a data-only communication mode over the data communication link, wherein the voice communication link is not monitored by the wireless communication device when in the data-only communication mode, and transferring a page halt message to the base station upon entry into the data-only communication mode, wherein the page halt message indicates the wireless communication device is halting receipt of further pages over the voice communication link;

in the base station, transferring the page halt message for delivery to a page distribution system in response to the page halt message;

in the page distribution system, receiving a voice call request for delivery to the wireless communication device;

if the page halt message has been received and the voice call request is associated with a person on a list, then transferring the voice call request in a second page for delivery to the wireless communication device;

if the page halt message has been received and the voice call request is not associated with a person on the list, then withholding the voice call request for delivery to the wireless communication device; and in the base station, upon receipt of the second page for delivery to the wireless communication device, transferring the second page over the data communication link.

2. The method of claim 1, further comprising:

in the wireless communication device, receiving the second page over the data communication link, and if the second page comprises a voice call page, accepting a voice call associated with the voice call page, and establishing the voice call.

3. The method of claim 2, wherein establishing the voice call comprises establishing the voice call over the voice communication link.

4. The method of claim 2, wherein establishing the voice call comprises establishing the voice call over the data communication link.

5. The method of claim 1, wherein the second page comprises a voice call page; and further comprising:

in the base station, if the page halt message has been received and upon receipt of the voice call page for delivery to the wireless communication device, transferring, over the data communication link, the voice call page and a voice communication link resource assignment message for establishing a voice call associated with the voice call page; and in the wireless communication device, receiving the voice call page and the voice communication link resource assignment message, and establishing the voice call over the voice communication link according to the voice communication link resource assignment message.

6. The method of claim 5, wherein the voice communication link resource assignment message comprises a code division multiple access (CDMA) extended channel assignment message (ECAM).

7. The method of claim 1, further comprising:
in the wireless communication device, receiving the second page over the data communication link;
if the second page comprises a voice call page and is associated with a person on a list, accepting the voice call associated with the voice call page, and establishing the voice call; and
if the second page comprises a voice call page and is not associated with a person on the list, ignoring the voice call associated with the voice call page.

8. The method of claim 1, further comprising:
in the page distribution system, halting transfer of the further pages for delivery to the wireless communication device in response to the page halt message.

9. The method of claim 1, further comprising:
in the page distribution system, transferring only the further pages which comprise voice call pages for delivery to the wireless communication device in response to the page halt message.

10. The method of claim 1, wherein entering into the data-only communication mode over the data communication link comprises, in response to user-application activity on the wireless communication device, entering into the data-only communication mode.

11. The method of claim 1, wherein entering into the data-only communication mode over the data communication link comprises, in response to radio frequency (RF) conditions associated with the voice communication link, entering into the data-only communication mode.

12. The method of claim 1, wherein entering into the data-only communication mode over the data communication link comprises, in response to movement of wireless communication device, entering into the data-only communication mode.

13. The method of claim 1, wherein transferring the page halt message to the base station upon entry into the data-only communication mode comprises transferring the page halt message over the voice communication link.

14. The method of claim 1, wherein transferring the page halt message to the base station upon entry into the data-only communication mode comprises transferring the page halt message over the data communication link.

15. The method of claim 1, wherein the voice communication link comprises a code division multiple access (CDMA) single-carrier radio transmission technology link (1xRTT).

16. The method of claim 1, wherein the data communication link comprises an evolution-data optimized (EVDO) link.

17. A method of operating a wireless communication system comprising a base station and a wireless communication device in communication over a voice communication link and a data communication link, the method comprising:
in the wireless communication device, entering into a data-only communication mode over the data communication link, wherein the voice communication link is not monitored by the wireless communication device when in the data-only communication mode, and transferring a page halt message to the base station upon entry into the data-only communication mode, wherein the page halt message indicates the wireless communication device is halting receipt of further pages over the voice communication link;
in the base station, transferring the page halt message for delivery to a page distribution system in response to the page halt message;
in the page distribution system, receiving a voice call request for delivery to the wireless communication device, if the page halt message has been received and the voice call request is associated with a person on a list, then transferring the voice call request in a page for delivery to the wireless communication device, and if the page halt message has been received and the voice call request is not associated with a person on the list, then withholding the voice call request for delivery to the wireless communication device;
in the base station, upon receipt of the page for delivery to the wireless communication device, transferring the page over the data communication link;
in the wireless communication device, receiving the page over the data communication link, accepting the voice call associated with page, and establishing the voice call over the voice communication link.

18. A method of operating a wireless communication system comprising a base station and a wireless communication device in communication over a voice communication link and a data communication link, the method comprising:
in the wireless communication device, entering into a data-only communication mode over the data communication link, wherein the voice communication link is not monitored by the wireless communication device when in the data-only communication mode, and transferring a page halt message to the base station upon entry into the data-only communication mode, wherein the page halt message indicates the wireless communication device is halting receipt of further pages over the voice communication link;
in the base station, transferring the page halt message for delivery to a page distribution system in response to the page halt message;
in the page distribution system, receiving a page for delivery to the wireless communication device;
if the page halt message has been received and the page is associated with a person on a list, then transferring the page for delivery to the wireless communication device;
if the page halt message has been received and the page is not associated with a person on the list, then withholding the page for delivery to the wireless communication device; and
in the base station, upon receipt of the page for delivery to the wireless communication device, transferring the page over the data communication link;
in the wireless communication device, receiving the page over the data communication link, and if the page comprises a voice call page, accepting a voice call associated with the voice call page, and establishing the voice call as a voice-over Internet protocol (VoIP) call over the data communication link.

* * * * *